G. A. KREBS.
THERMOSTAT CONTROL.
APPLICATION FILED JULY 21, 1921.
1,436,399.
Patented Nov. 21, 1922.
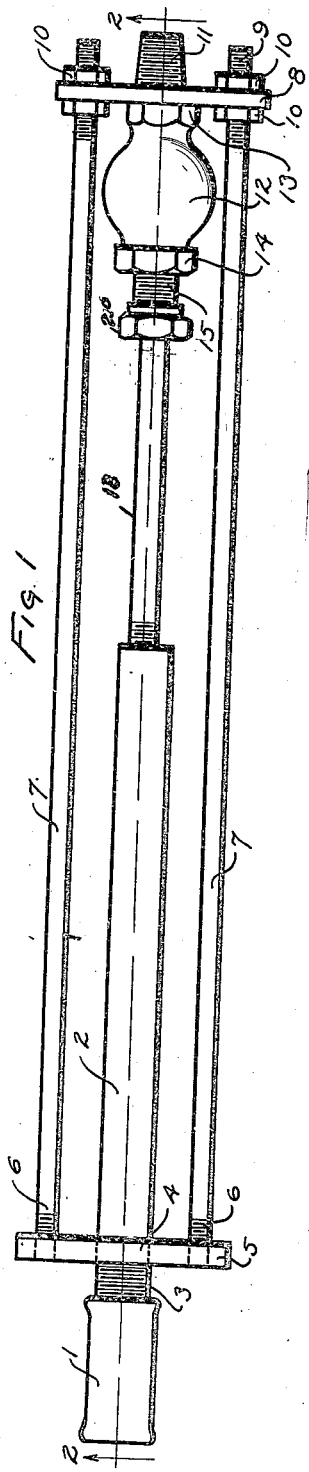
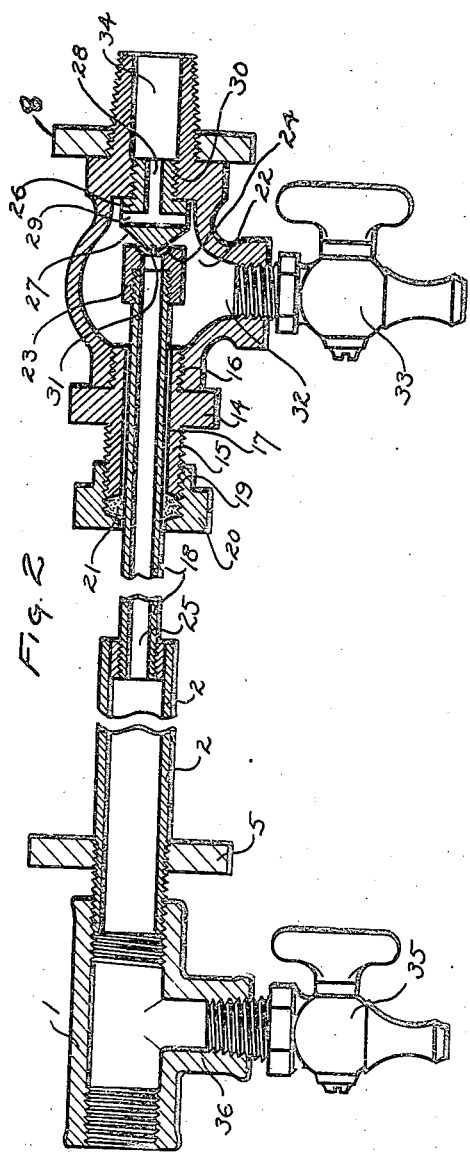
Inventor
George A. Krebs.
By Toulmin & Toulmin
Attorney Patented Nov. 21, 1922.

1,436,399

UNITED STATES PATENT OFFICE.

GEORGE A. KREBS, OF DAYTON, OHIO.

THERMOSTAT CONTROL.

Application filed July 21, 1921. Serial No. 486,640.

*To all whom it may concern:*

Be it known that I, GEORGE A. KREBS, a citizen of the United States, residing at Dayton, in the county of Montgomery and State of Ohio, have invented certain new and useful Improvements in Thermostat Controls, of which the following is a specification, reference being had therein to the accompanying drawing.

My invention relates to a thermostat control and in particular to such a control applied to steam traps and the like.

It will be understood that my invention is applicable, however, to the regulation of supplies of gases and liquids, or to the relative supply of either, and is adapted to the regulation of electrical circuits as well as a supply of gas which is being delivered for the purpose of lighting or heating.

My invention is applicable to steam traps, domestic hot water heaters, and has numerous other applications of which the foregoing are typical.

The object of the invention is to provide a very simple and effective means for automatically controlling the flow of water and steam as in steam traps. It is my object to provide a mechanism which will permit of the exit of the hot water and upon the complete exit of the water will shut the valve automatically, thus preventing the escape of steam. It is a further object of my invention to provide a construction which may be readily adjusted for varying conditions of use and which may be readily adjusted in order to determine and fix upon the exact positions of the parts to secure their maximum functioning. It is also my object to provide an apparatus, the functioning of which may be easily tested in a simple manner by those who may be unskilled, but who are charged with the operation of the machinery to which my device is attached.

It is a further object of my invention to provide a mechanism with valve parts which are readily renewable, so that if corrosion takes place or erosion, due to the action of gases or liquids and the like, new parts may be substituted for old parts without materially disturbing the structure as a whole.

It is a further object of my invention to provide varying means of furnishing this thermostat control and varying forms of passageways for the delivery of gases and fluids.

It is my object to provide a mechanism in which the heated fluids or gases may pass through the thermostatic element and in other cases may pass adjacent to it, depending upon the arrangement and size of the various parts.

Referring to the drawings:

Fig. 1 is a plan view of the mechanism assembled; and

Fig. 2, is a section on the line 1—1 of Figure 1, looking in the direction of the arrows.

Referring to the drawings in detail, 1 is a coupling connecting the apparatus to a supply pipe such as a steam pipe. Into 1 is threaded a thermostatic element 2, preferably of brass, which is tubular. 2 is threaded into 1 at 3 and is also threaded at 4 into a cross member 5. This cross member has threaded into either end of it, as at 6—6, spacing rods 7—7. These rods are passed through another spacing cross member 8.

The ends of 7—7 that pass through 8 are threaded as at 9. 10—10 are lock nuts which embrace 8 and are threaded on 9. Threaded in 8 or projecting therethrough is the threaded end 11 of the valve casing 12. The valve casing 12 has a hexagonal shoulder 13 that abuts against 8. 14 is another hexagonal member that is a part of the threaded member 15 that is threaded into the casing 12 as at 16. Within 15 is a tubular passageway 17 through which passes a projection of the thermostatic element 18, a tubular member through which the liquids and gases pass. There is a threaded collar that is threaded upon 15 as at 19. This collar is designated 20. Within the collar, abutting against the end of 15 and contained within the collar itself is packing 21 that surrounds the tubular member 18. Within the casing 12 is a chamber 22 into which projects the free end of the tubular member 18. On the free end of this tubular member is threaded an annular valve seat 23 that has a tapered seat 24, the bottom of which communicates with the passageway 25 within 18. The valve member 26 which has a tapered head 27 to co-operate with the tapered seat 24 has a main passage way 28 and a cross passage way 29. This member 26 is threaded at 30 in one portion of the casing 12. It has a cutaway portion 31 across the nose of the tapered portion 27 which facilitates the unscrewing of this valve member and its adjustment.

In practice it is usual to insert a tool with a right angled bend at the end thereof into the cross passage way 29 and thus assist in the removal of the entire valve member 26. To one side of the valve casing is an exit passage way 32 into which is threaded a pet cock 33. There is another exit passage way 34 which communicates with the feed water or with a tank depending upon the arrangement of this apparatus. It is thus possible to interchange the location of the exit pipe from 34 to 32 and place the petcock 33 in 34 if it is desired. 34 may be internally threaded for that purpose. The purpose of the petcock is to enable one not skilled in the adjustment of this mechanism to test its functioning by opening the petcock for a purpose to be hereinafter described.

A similar test petcock will be found at 35. It is threaded into a right angled tubular projection 26 of 1. The function of this test petcock will be described later.

The union between 2 and 18 may be of any desired character. In practice I may prefer to make the entire tubular structure composed of 2 and 18 in the drawing of one piece. This is immaterial.

Method of operation:—In operation, the combined steam and hot water, or in the case of a steam trap, first the hot water and then the steam, will be passed through the pipe 2 and into the pipe 18. The valve will be open and the water will pass out into the exit passage way. As soon as the steam starts to flow through the pipe line and thus increase the temperature of the line, the expansion of the metal composing this line which is a thermostatic element, will serve to close the valve by moving the valve seat against the member or the valve member against the seat, thus shutting off the movement of the steam. As soon as any water collects in the line, thus reducing the temperature, the thermostatic element will contract it, and the water will be allowed to pass out of the valve member.

In practice in installing this mechanism, I have the nuts 10—10 loose so that I can move the casing 12 together with its valve member 26 to a point where this action takes place properly and then I clamp the nuts in position against 8, retaining the several members in their proper relative positions. In order to test the functioning of the equipment, the petcock 33 can be operated to ascertain if the water and steam come out together or if the water comes out only. If only the water makes its exit it is evidence that the thermostatic element is operating and shutting off the steam immediately after the water passes out.

It will be apparent that in a domestic hot water heater this arrangement may be used to cut in or cut out the burning of the gas and heating the water, so that when the temperature gets to a certain predetermined point the thermostatic element will operate and cut off the gas.

In practice, it is a matter of great advantage to have a mechanism of this character which may be located in a very narrow and restricted area, that can be placed in any position and that does not need to be located where it shall be accessible for elaborate repairs. The ordinary steam trap is bulky, cumbersome and it is necessary that it be located where it can be gotten at and proper repairs made to it at frequent intervals.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. In a steam trap, the combination, with a thermostatic element having a passageway therethrough and a valve seat at one end thereof, of a casing surrounding said valve seat, and a valve within said casing in line with said passageway and provided with an opening therethrough, said valve and seat so cooperating that the water which enters said passageway will pass between said valve and its seat and through said valve opening and the steam will be confined in said passageway by said valve after the water has passed said valve.

2. In a steam trap, the combination, with a thermostatic element having a passageway therethrough, and a valve seat at one end thereof, and means at the other end of said thermostatic element for connecting it to a steam supply, of a casing surrounding said valve seat, a valve within said casing in line with said passageway and provided with an opening therethrough, said valve and seat so cooperating that the water which enters said passageway will pass between said valve and its seat and remove any sediment that may collect thereon and thence pass through the opening in said valve and the steam will be confined in said passageway after the water has passed said valve, said casing having an outlet provided with means for opening and closing said outlet to determine whether the trap is operating properly, and said connecting means also being provided with an outlet having means for opening and closing the same, both of said outlets communicating with the passageway in said thermostatic element when said valve is open and the outlet in said valve casing being cut off from communication with said passageway when said valve is closed.

In testimony whereof, I affix my signature.

GEORGE A. KREBS.